Oct. 1, 1935.   A. R. NYQUIST   2,015,814
ELECTRODE FOR ARC WELDING
Filed March 21, 1934
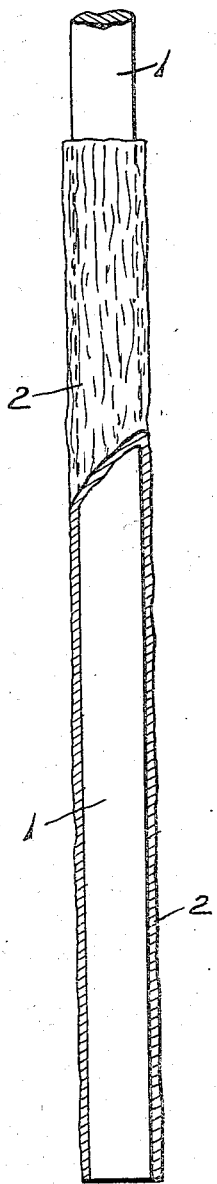
Inventor
August R. Nyquist
By Albert R. Dietrich
Attorney Patented Oct. 1, 1935

2,015,814

UNITED STATES PATENT OFFICE 2,015,814

ELECTRODE FOR ARC WELDING

August R. Nyquist, Roseau, Minn.

Application March 21, 1934, Serial No. 716,706

6 Claims. (Cl. 219—8)

My present invention relates to the art of electric arc welding and it particularly has for an object to provide an electrode, the use of which will give a very stable arc both for cutting and welding.

Further, it is an object to provide a new and improved flux for coating the electrode rods, the use of which will enable a better job of welding to be done than by the use of those rods now commonly employed.

Further, it is an object to provide a flux that will enable the use of a cast iron rod (instead of the mild steel rods now employed for the purpose) in welding cast iron so that the material filled in may be of the same texture as the base material.

Further, it is an object of the invention to provide an electrode of such construction and composition that the arc is stabilized and controlled and the heat will not burn out some of the chemical elements composing the cast iron, nor will the cast iron become hard and brittle and unworkable as is the case where a bare rod is used. In other words, it is an object of the invention to provide a flux combined with a cast iron rod (or rod of the same material as the part to be welded) which, when used, will not only result in a better weld as such but will leave the material in its natural or normal state.

Other objects will in part be obvious and in part be pointed out hereinafter.

In the drawing the figure is a vertical longitudinal section and part elevation of an electrode embodying my invention.

In the drawing, I represents the rod of the material like that to be welded. For example, if the base material to be welded is cast iron the rod will be cast iron. This rod is coated with a flux 2 composed of the ingredients mentioned below and compounded in substantially the manner hereinafter described.

In order to make my new and improved flux I take magnesium sulphate ($MgSO_4$) and sodium bicarbonate ($NaHCO_3$) and dissolve them separately in hot water. I use approximately equal parts of each. Having dissolved these ingredients separately in hot water the two hot solutions are brought together, whereupon a somewhat violent reaction takes place with the liberation of gas composed principally, if not wholly, of carbon dioxide ($CO_2$). When the reaction has apparently ceased I add a small portion of magnesium sulphate. If no further chemical action appears to take place I know that the sodium bicarbonate has been neutralized. However, if when I add a small portion of sodium bicarbonate to the substance chemical action appears to take place, then the magnesium sulphate has not been neutralized and more sodium bicarbonate must be added until the chemical action ceases, etc.

To the substance thus obtained, which substance I shall hereinafter refer to as "basic compound", I add separately hot aqueous solutions of potassium nitrate ($KNO_3$) and borax ($Na_2B_4O_7$). To this mixture I then add calcium carbonate ($CaCO_3$) and magnesium carbonate ($MgCO_3$). Care should be taken not to add the borax to the "basic compound" before its ingredients shall have become neutralized, for if it should be added before neutralization the chemical action would stop and in that event more or less of the carbon dioxide would remain intact, in proportion to the unneutralized chemicals, and would hinder the proper chemical action of the flux under the heat of the arc.

As to the proportion of ingredients used in making up the flux I will say that substantially equal parts of magnesium sulphate and sodium bicarbonate are used to produce the "basic compound".

In producing the flux of my invention the most effective proportions are as follows:

| | Per cent |
|---|---|
| "Basic Compound" | 28 |
| Potassium nitrate | 26 |
| Calcium carbonate | 26 |
| Borax | 10 |
| Magnesium carbonate | 10 |

These proportions may, however, be varied between certain limits and still produce a useful flux. For instance "basic compound" may be varied between 20% and 36%, potassium nitrate between 20% and 40%, calcium carbonate between 15% and 40%, borax between 5% and 15%, and magnesium carbonate between 5% and 15%.

Therefore when in the appended claims I make reference to "the proportions stated" of the various ingredients I have reference to these variations of the percentages within the limits stated.

I wish it to be understood that while the flux can be used for coating other rods than those made from cast iron, the main object is to take a rod made of cast iron and coat it with this flux and use the coated rod as an electrode for electric arc welding. The rod so coated will give a very stable arc, both for cutting and welding, and when a rod is made of cast iron covered with my flux as the material is deposited across the arc it will retain its proper chemical and physical composition.

In welding of cast iron or steel, the cross section being one-half inch or more, by tack welding one side so as to hold the parts to be welded in proper alignment, then placing the part to be welded so that the broken section is in a vertical position, then taking a rod that is made from the same material as the material that composes the part to be welded, coated with the flux as has been explained, this rod can then be used as an electrode for cutting or welding or scarfing out material for welding, etc., scarfing out about halfway through the break on the opposite side of the tack weld leaving the tack weld intact so as to hold proper alignment until the part that was scarfed out has been welded in. Then, it will be understood, that the welded part will replace the tack weld for holding proper alignment, then the part or side that was tack welded is scarfed out until the welded part is reached and again the scarfed out part is welded in making the weld complete. It will be understood that by taking the parts as they are broken and placing them together and then tack welding as has been explained, the alignment of the parts is more readily arrived at than by scarfing out the broken section by other means and then placing the broken parts on a table or other fixture to be lined up and then welded. Also by using the arc for scarfing out the broken section the base material is heated so as to aid in bringing about proper fusion.

Briefly stated then my flux comprises the "basic compound" combined with other alkali materials in such a way as to give the results that would be obtained by using the flux composed of the specific ingredients above mentioned in their completeness. For instance, there are many alkali materials (such as boric acid, sodium carbonate, gypsum, potassium carbonate, potassium chlorate, potassium permanganate, and iron oxide for example) that could be combined with the "basic compound" in such a way as to obtain the same chemical analysis of the weld as would be obtained with the flux using the ingredients hereinbefore specifically mentioned. When in the claims I refer to "suitable alkali materials" I desire it to be understood that the same refers to the alkali materials enumerated in the parentheses in this paragraph.

From the foregoing description, it is thought the invention will be readily understood by those skilled in the art to which it appertains as will also its advantages.

What I claim is:

1. A welding electrode comprising a rod composed of the same base metal as that to be welded and covered with a flux composed of "basic compound" combined with suitable alkali materials in substantially "the proportions stated".

2. A welding electrode comprising a rod composed of the same base metal as that to be welded and covered with a flux composed of "basic compound" combined with potassium nitrate, borax, calcium carbonate and magnesium carbonate in "the proportions stated".

3. A welding electrode comprising a rod composed of the same base metal as that to be welded and covered with a flux composed of "basic compound" 28%, potassium nitrate 26%, borax 10%, calcium carbonate 26% and magnesium carbonate 10%.

4. A flux for use in welding electrodes, comprising magnesium sulphate, sodium bicarbonate, potassium nitrate, borax, calcium carbonate and magnesium carbonate compounded in substantially the manner hereinbefore described and in substantially "the proportions stated".

5. A flux for welding electrodes which comprises "basic compound" combined with potassium nitrate, borax, calcium carbonate and magnesium carbonate in "the proportions stated".

6. A flux for welding electrodes which comprises "basic compound" 28%, potassium nitrate 26%, calcium carbonate 26%, borax 10% and magnesium carbonate 10%.

AUGUST R. NYQUIST.